Dec. 9, 1969  M. A. S. BLURTON  3,483,361
AUTOMATIC FARE COLLECTION SYSTEM

Filed Jan. 5, 1965  11 Sheets-Sheet 1

Inventor
Michael A. S. Blurton
By
Marrian, Smith & Marshall
Attorneys

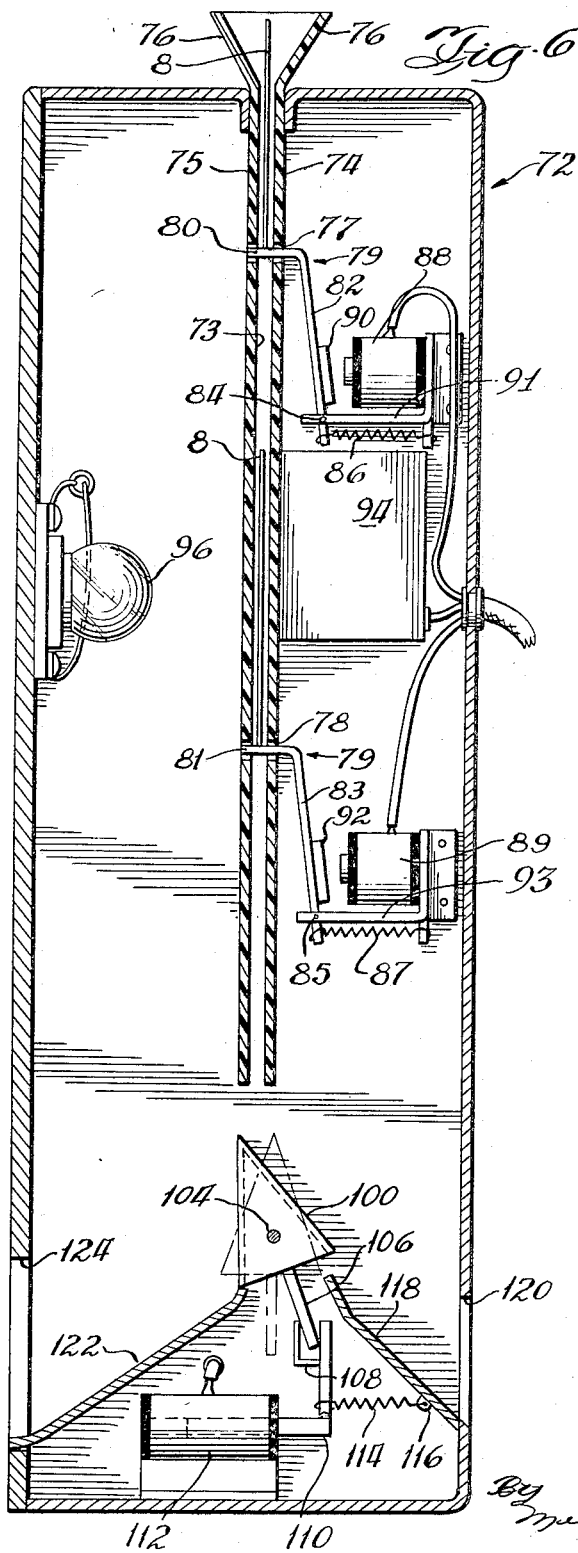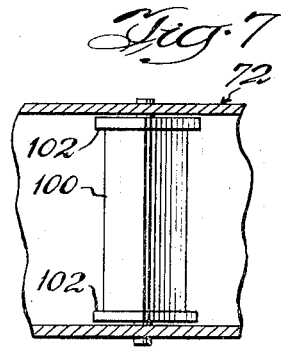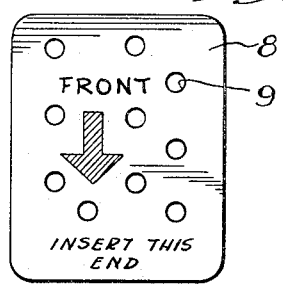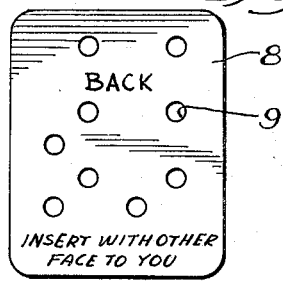

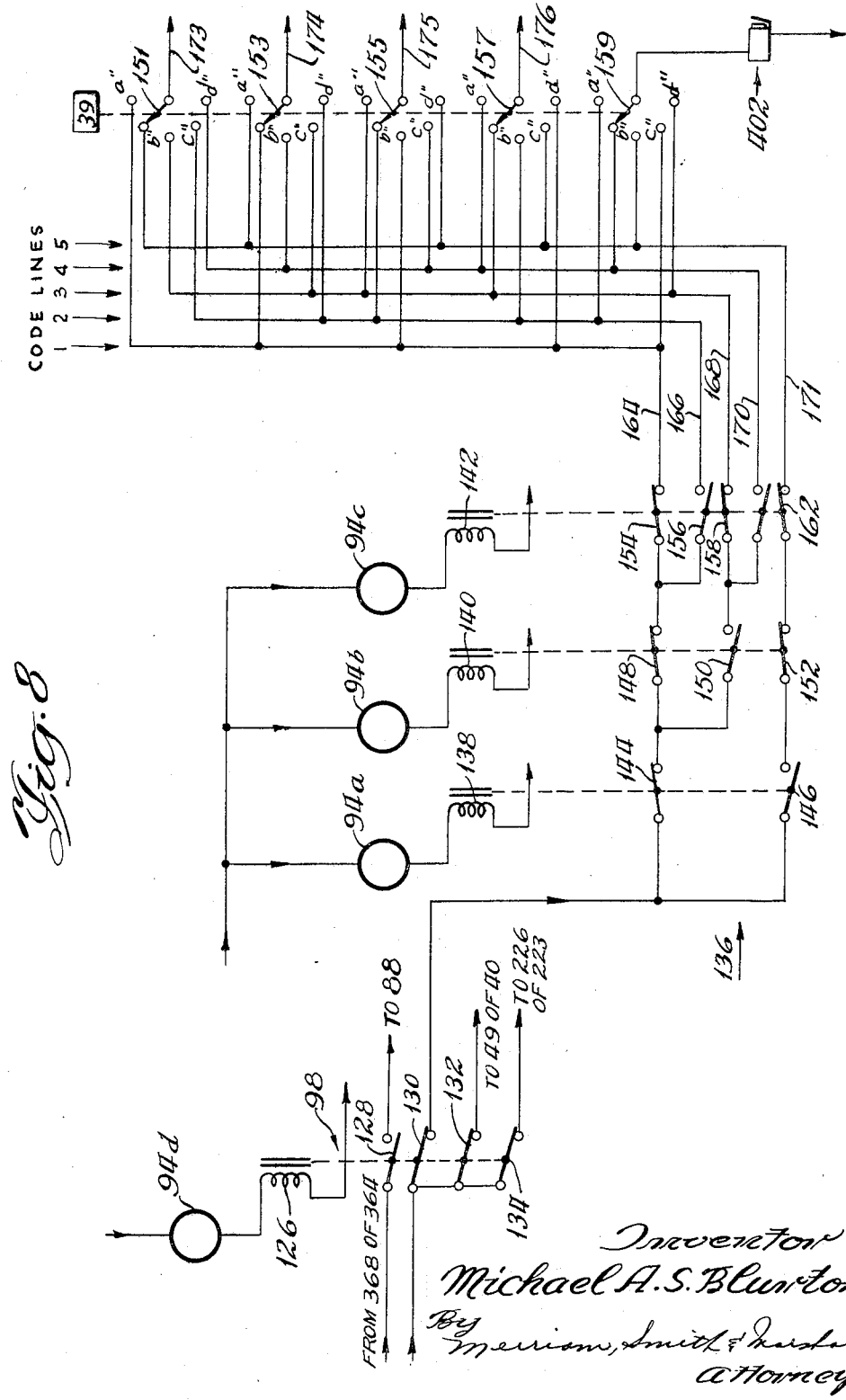

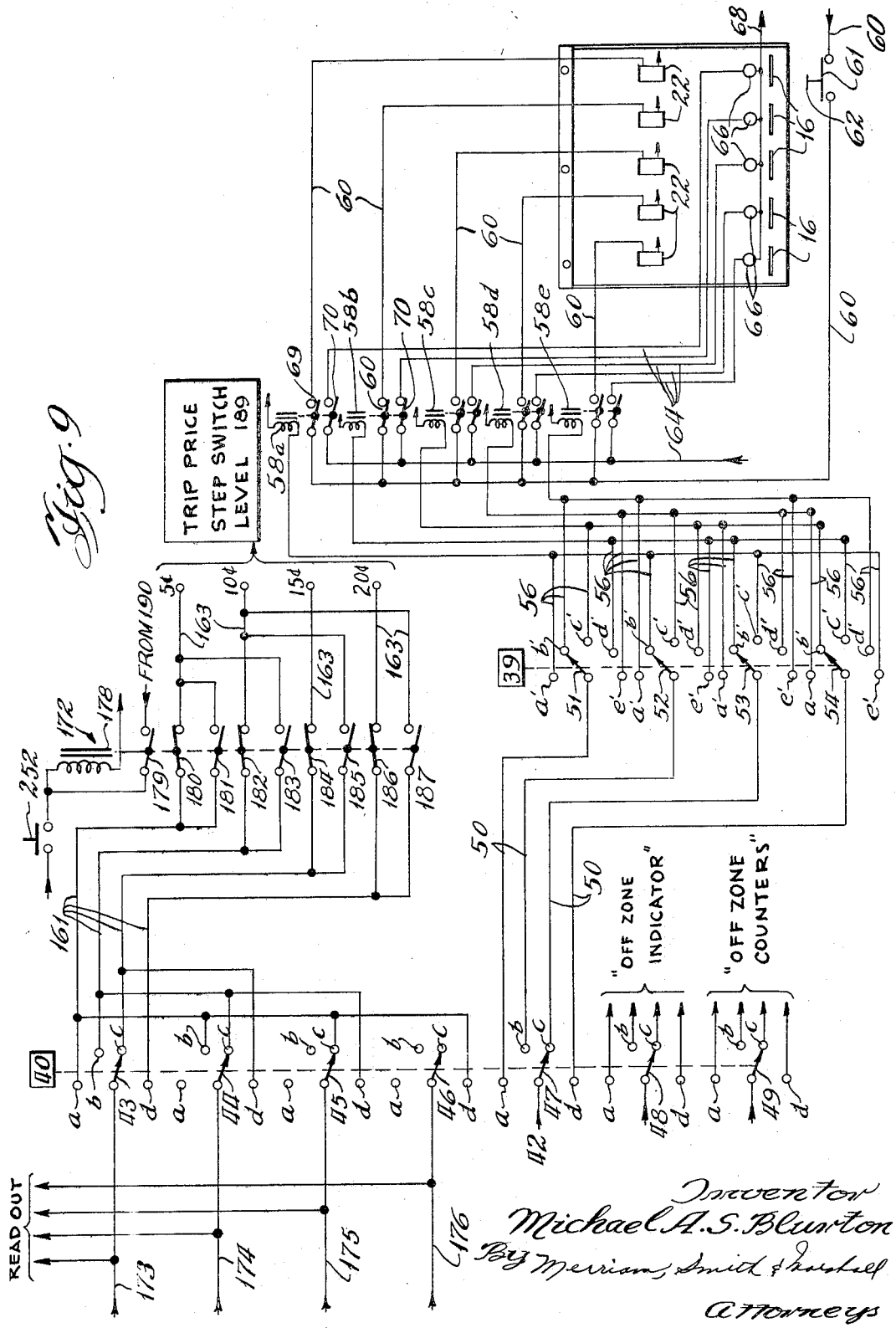

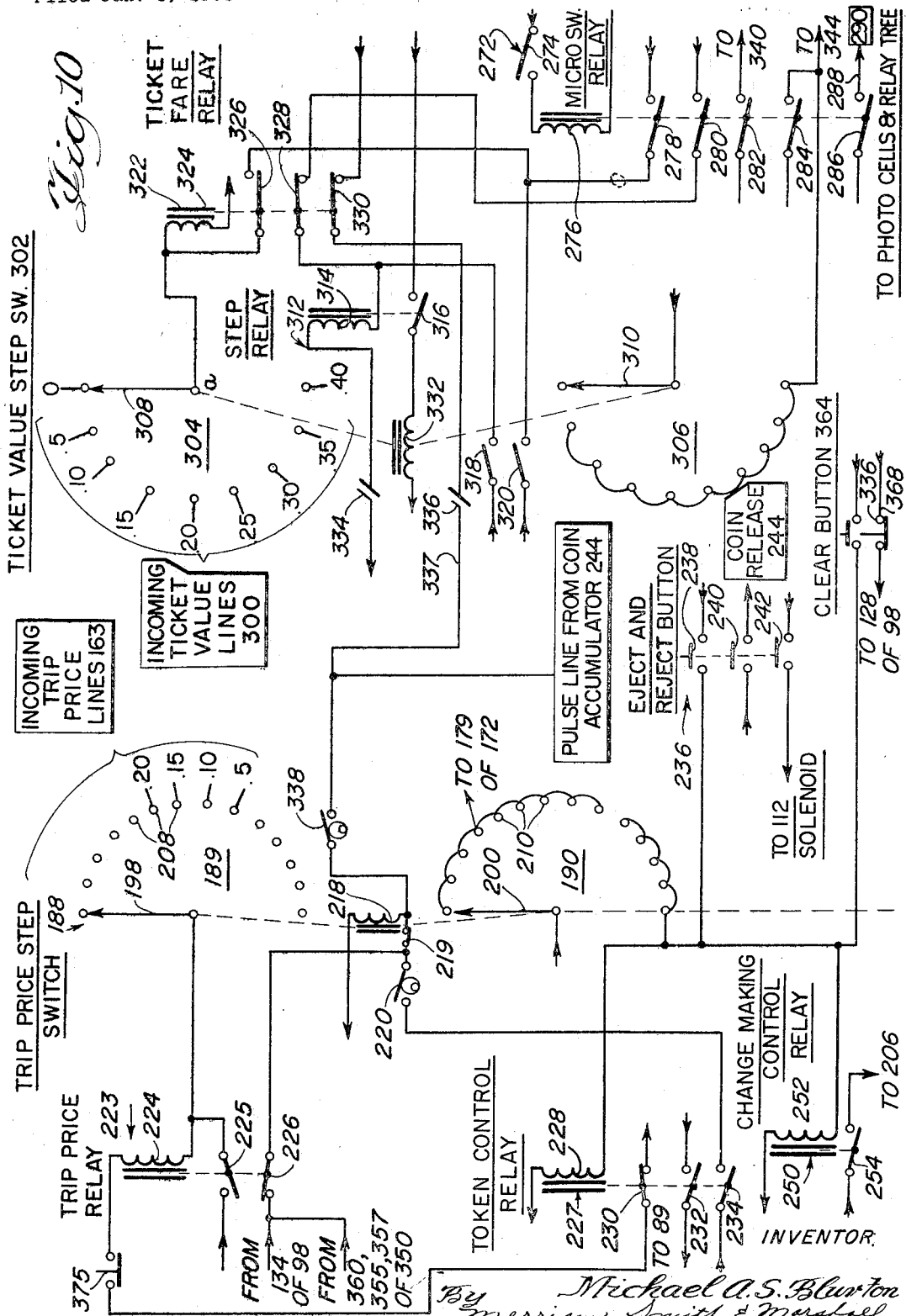

Dec. 9, 1969 M. A. S. BLURTON 3,483,361
AUTOMATIC FARE COLLECTION SYSTEM
Filed Jan. 5, 1965 11 Sheets-Sheet 6

Inventor
Michael A. S. Blurton
By Merriam, Smith & Marshall
Attorneys

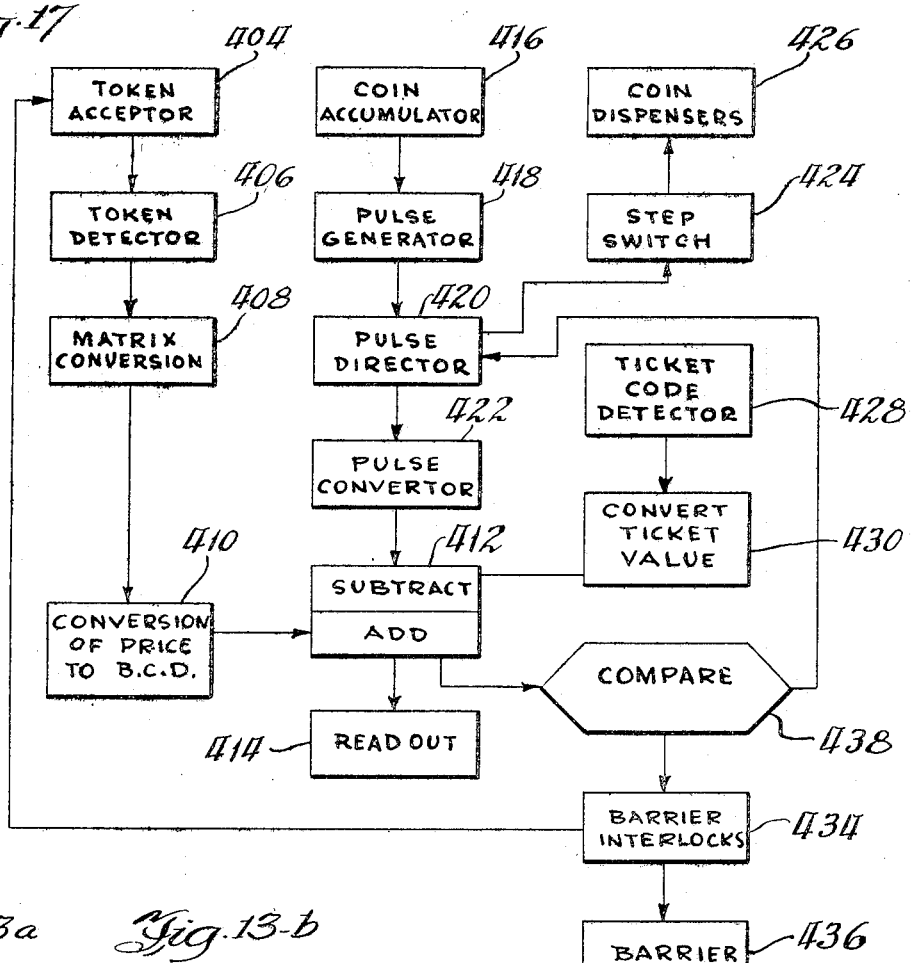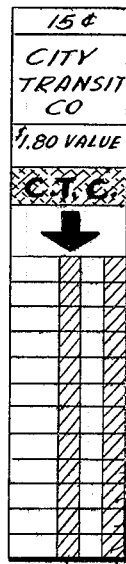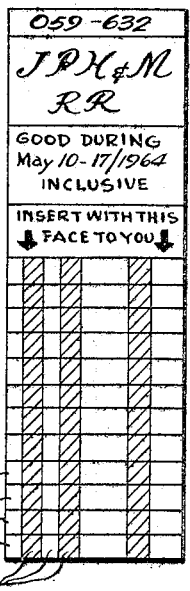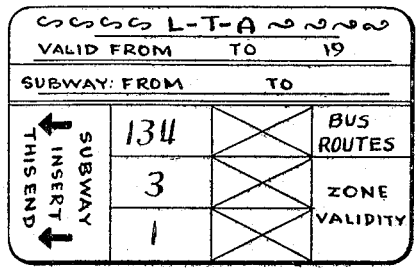

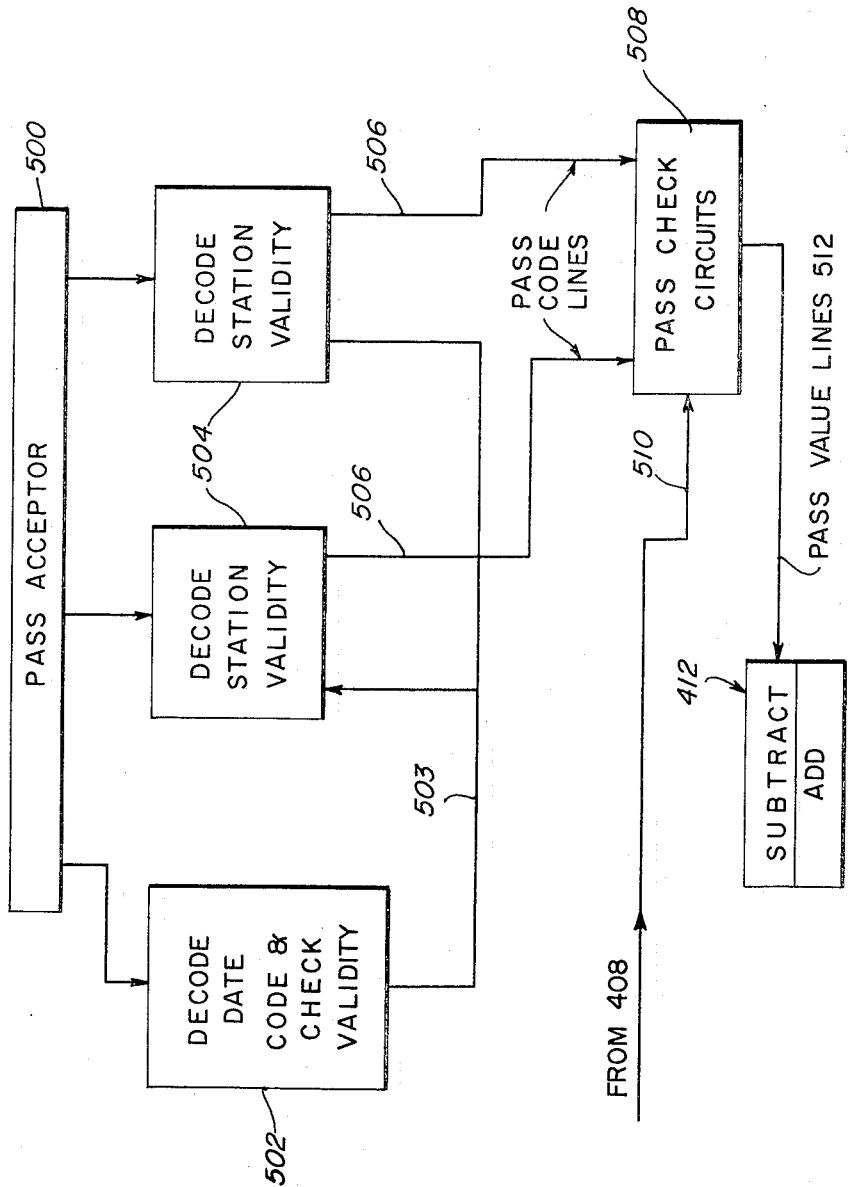

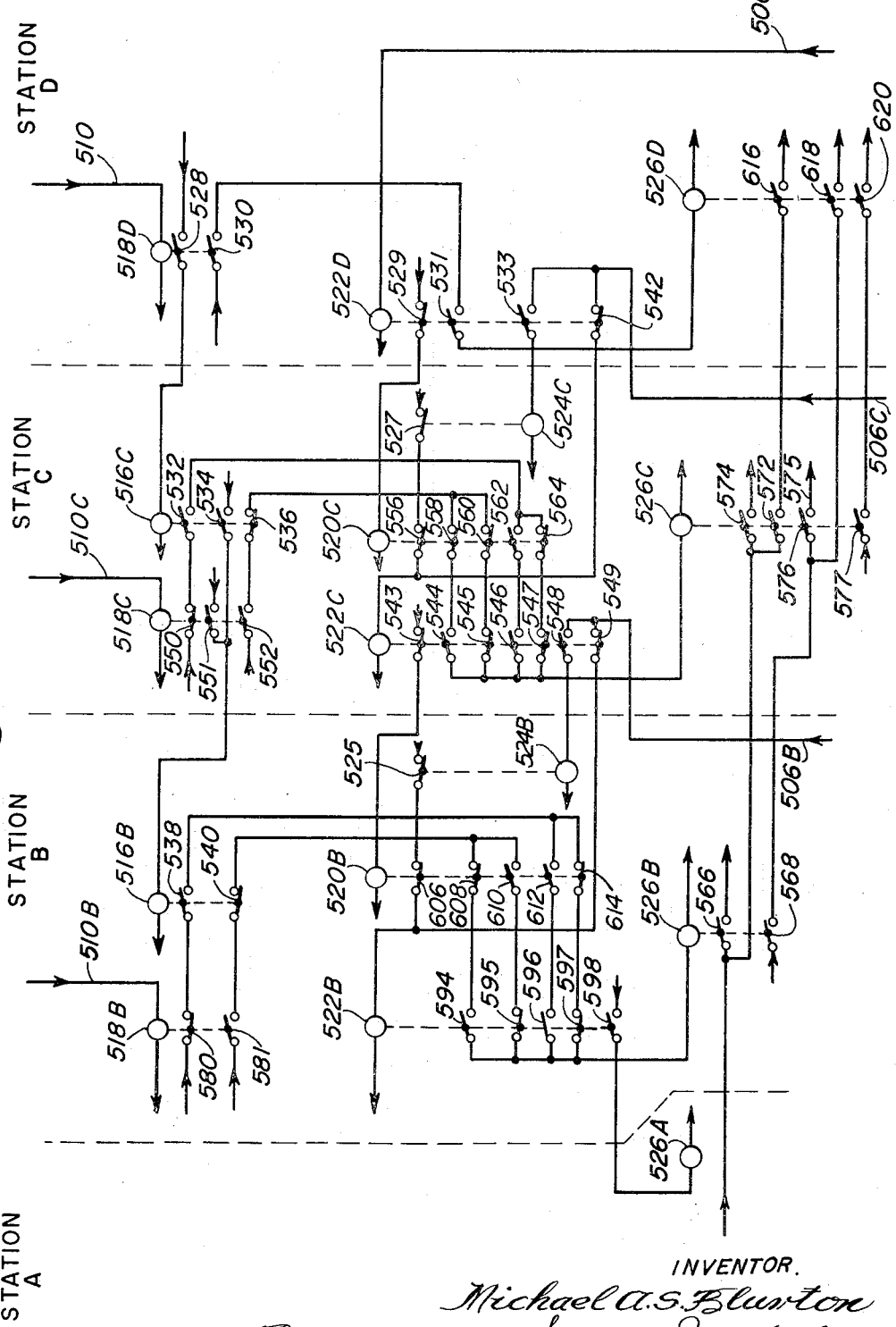

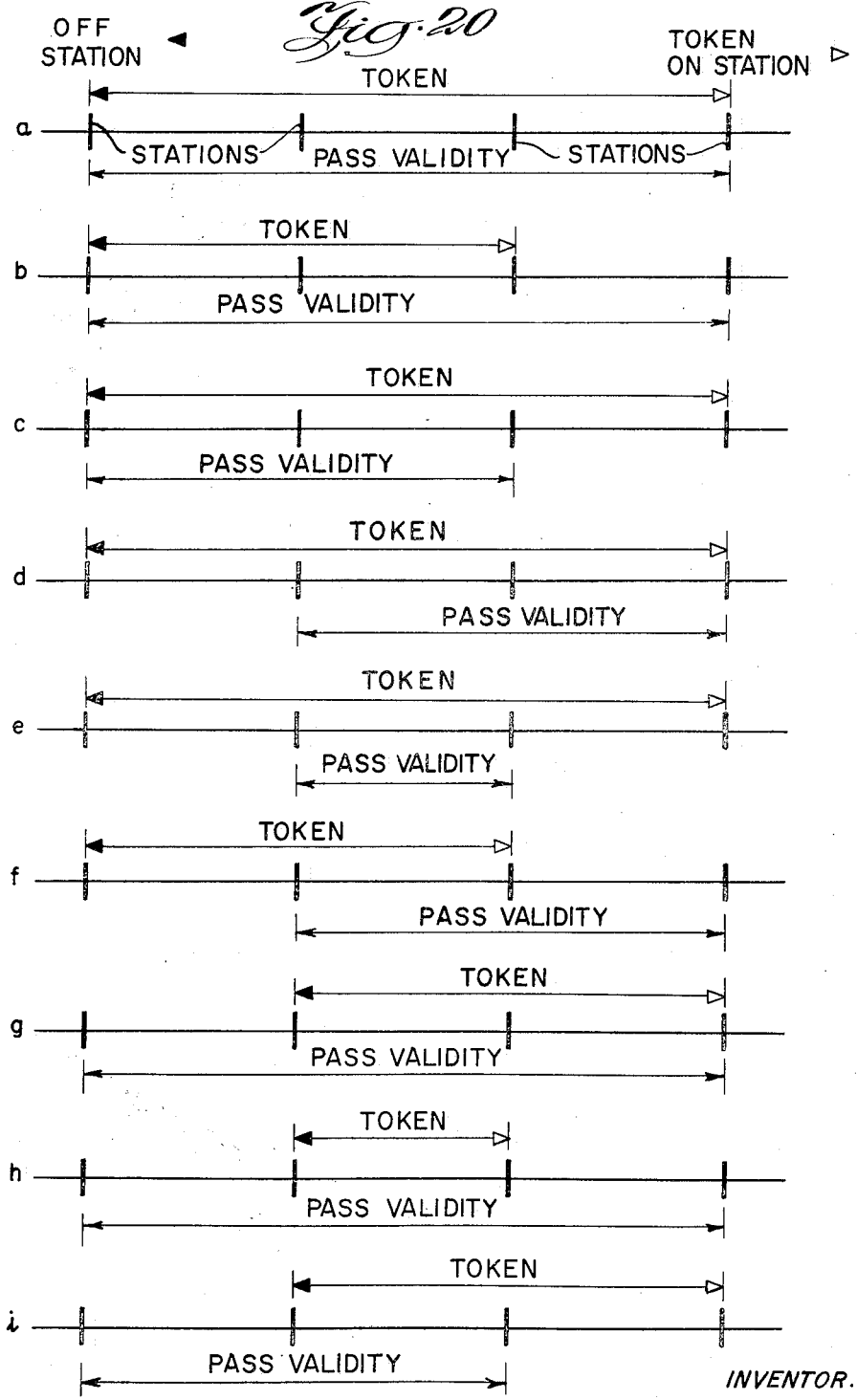

United States Patent Office 3,483,361
Patented Dec. 9, 1969

3,483,361
AUTOMATIC FARE COLLECTION SYSTEM
Michael A. S. Blurton, Urbana, Ill., assignor to The University of Illinois Foundation, a non-profit corporation of Illinois
Continuation-in-part of application Ser. No. 364,854, May 4, 1964. This application Jan. 5, 1965, Ser. No. 424,456
Int. Cl. G06k 17/00
U.S. Cl. 235—61.6     1 Claim

ABSTRACT OF THE DISCLOSURE

An automatic multiple-zone fare collection system utilizing a code-bearing token representative of a zone in which the token is selectively dispensed to a boarding passenger. The system includes electrical selecting means to identify a token with a particular zone, and with the capability of changing the identities. Said electrical code-reading and calculating means read the code-bearing token and calculate the fare for a deboarding passenger, with automatic means being provided for collecting the fare and comparing the amount collected with the calculated fare to register payment of the fare.

---

This application is a continuation-in-part of applicant's copending application Ser. No. 364,854, entitled "Automatic Fare Collection System," filed May 4, 1964, now abandoned.

This invention relates to a system for computing and collecting payments due which are related to the zones of distance travelled on or by a transportation mode. More specifically, this invention relates to charges paid for movement upon public transportation facilities, such as road, rail, water and air modes, and for toll charges for vehicles using roadways. Still more specifically, this invention relates to an automatic multiple-zone or fare-stage fare collection and statistical data recording system for use by a passenger-carrying public transportation organization. The term "transit" is used herein as encompassing any system or mode which involves passengers and/or vehicles in transit from one location to another.

A number of transit systems operate, or can be operated, on a zoned fare basis wherein the fare paid by the passenger is proportional to the distance travelled, which might include a direct multiple fare system, or a differential and tapered fare system. It should be understood that the phrases "multiple-zone" and "multiple-zone fare" as used herein and in the appended claims is intended to embrace both the direct multiple fare system and the differential or tapered fare system. It is the purpose of this invention to provide an automatic fare collection system for a transit operator employing zoned fares based on the post-checking of fare payment whether by cash, ticket or the like.

The invention, together with its objects and advantages, will best be understood from the following detailed description and some embodiments thereof taken in conjunction with the accompanying drawings, in which:

FIGURE 2a is a front view of an alternative embodiment of the token;

FIGURE 2b is the back view of the token in FIGURE 2a;

FIGURE 6 is a vertical sectional view of the token detector means employed in the invention;

FIGURE 7 is a fragmentary plan view illustrating in greater detail the token guideway;

FIGURES 8, 9, 10 and 11 illustrate diagrammatically electrical circuit means for the information handling and operational functions of the system in accordance with the invention;

FIGURE 12 is a wiring diagram for the excess fare circuit of the system of the invention;

FIGURES 13a and 13b are front views of typical stored-value ticket suitable for use in the system of the invention;

FIGURE 15 is a front view of a pass suitable for use in the issue system of the invention;

FIGURE 17 is a block diagram illustrating a general embodiment for use in a rail system;

FIGURE 18 is a block diagram illustrating a still further embodiment of the invention employing a coded pass;

FIGURE 19 is a wiring diagram for the coded pass system of the invention; and

FIGURE 20 illustrates schematically the relationship between the value of the coded pass and the journey taken.

Figure 3:
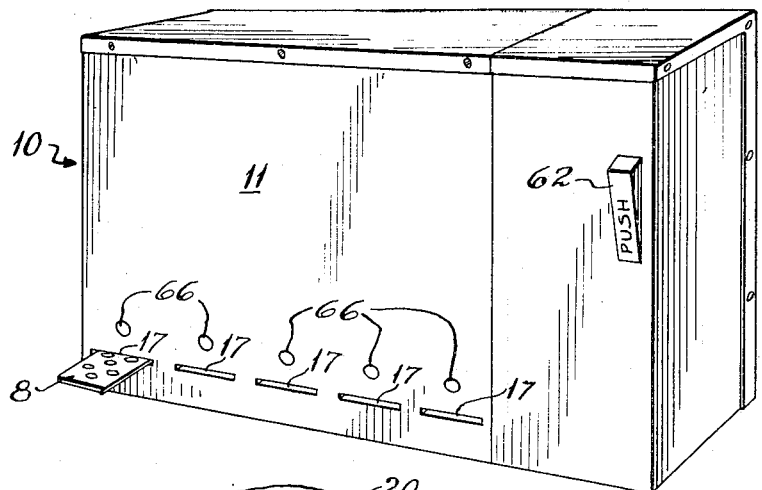
FIGURE 3 is a perspective view of a dispenser suitable for retaining and dispensing the tokens.
Figure 5:
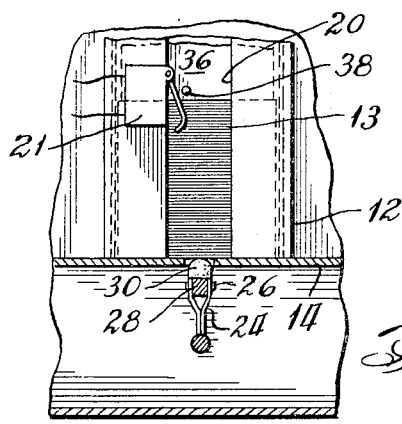
FIGURE 5 is a cross-sectional view on line 5—5 of FIGURE 4.

In general, the automatic fare collection system of my invention contemplates a multiple zone transit system based on the post-checking of fare payment by the passenger.

According to my invention, the fare collection system utilizes a code-bearing token, such as a token perforated in a prearranged pattern designating a code. The token is selectively dispensed to the passenger at boarding, and the code is representative of the zone in which the token is dispensed. The system contemplates multiple zones, and therefore tokens are provided of differing codes for detecting and calculating the fare for the distance travelled.

A zone selector means is provided for indicating the zone in which the vehicle is positioned in the case of bus transit. In the case of rail transit, such a selector is not required, as the equipment stays at one station location. For the bus, the zone selector means is changed with each change in zone position for the vehicle. There also is provided a code selector means which is set periodically by a transit official, such as at the end of a trip in the case of bus, or each day in the case of rail transit. The code selector means is employed to scramble the issuance of the tokens, such that it is possible to alter or vary the coded token used within a zone. Thus, the code selector means, and also the zone selector means on a bus, having been set by the transit official, e.g. driver or station agent, the token is selected which is to be dispensed to the passenger as representative of the zone at boarding.

Upon deboarding or alighting, a detector means reads or deciphers the coded token and calculates the fare and transmits the information to a fare indicator or fare. readout. The detector means may comprise, for example, a photoelectric reading head and an electric circuit means comprising electrically operated relays with associated contacts or a solid state decoding matrix. It should be understood that at deboarding the passenger may have travelled into a zone differing from the one at which he boarded, and for the bus the zone selector means was changed accordingly, but the trip code selector means having remained the same. The detector will transmit the zones travelled based on the code for that token selected at the time of boarding.

A fare collection system is provided for accepting the fare from the passenger and permitting the passenger to proceed. For this purpose, a proprietary cash accumulator and coin dispenser may be advantageously employed. It is contemplated that other fare collecting means may be employed, such as using tickets having a stored-value whereby a ticket detector cancels the fare paid.

Referring to the drawings, the token 8 comprises a substantially rectangular card having dimensions of approximately 1½ x 2 inches for rail and 1 x 2 inches for bus, a thickness of 0.010 to 0.020 inch, and is derisably provided with rounded corners. The token is desirably a plastic card, but it may be formed from other materials such as paper, metal, etc. Also, it should be understood that the token may have dimensions different from those designated depending upon such factors as the particular transit system, the design of the instruments employed in handling the token and other related circumstances.

Figure 1:
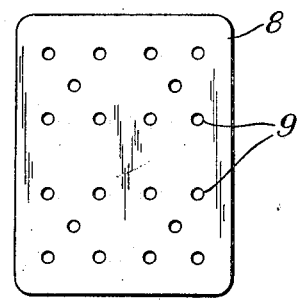
FIGURE 1 is a front view of a typical perforated token suitable for use in the invention.
Figure 4:
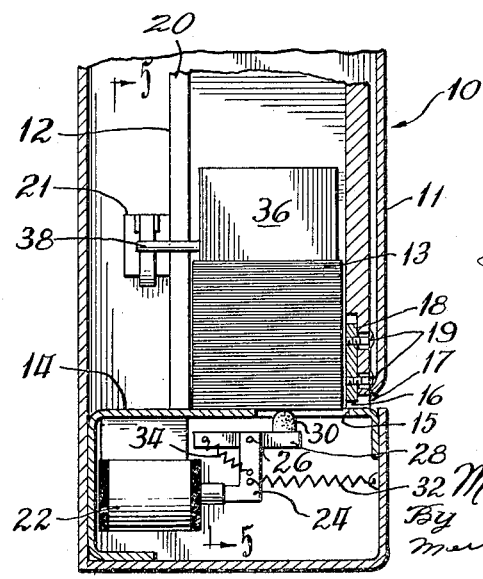
FIGURE 4 is a fragmentary cross-section of the dispenser illustrating the means for retaining the tokens and ejecting the tokens therefrom.

The token is perforated with a plurality of punched holes 9 in a prearranged pattern designating a code. In the preferred embodiment of the invention for the bus, the pattern of perforations or holes is of a reflected binary code type so that the token is symmetrical with respect to any of its four possible positions of insertion. (See FIGURE 1) In this manner, one quadrant only of the token is used for detection of the fare, as explained more fully hereinbelow, and when the token is inserted into the detector chute by the passenger, the need for orienting the token in the detector by the passenger is eliminated. Hence, there is no upside-down or wrong-way-around position for the token. It is also advantageous, and therefore preferable, to employ a substantially rectangularly shaped token such that the chute of the detector will orientate the token vertically, as will be more apparent hereinafter.

The code type for the token is a modified arrangement of pure binary, although any form of binary can be used to meet the requirements of the operator. For instance, a particular code arrangement may be required for certain subsequent statistical data processing operations. For illustrative purposes only, a pure binary form of code is used with the token illustrated having a maximum of five holes so that up to thirty-two codes may be carried. If a transit system does not require a total of thirty-two codes, then the token is provided with a lesser number of holes. In the token and system illustrated, only three holes are used which would give a potential of eight codes. There are more potential codes carried in the tokens than there are potential zones at any one time. The system shown for illustrative purposes only and set forth in the drawings employs four zones only so that five codes are used.

The pure binary code is not essential to the operation of the fare collection system of the invention, and where desired the token card may be prepunched for a modified binary form for convenience of subsequent data processing. This may require more relays in the relay tree detection circuits, but the outputs will take the same form of price lines.

The codes used for the tokens are scrambled periodically such as between trips in order to overcome fraud. If fraud is attempted, the perpetrator is in effect playing a game of chance against the transit company with the game heavily weighted in favor of the transit company. The result is that fraud may be rapidly detected.

Where desired, a different size or shaped token may be used, and the prearranged pattern of holes need not be repeated in each quadrant or other section of the token. (See FIGURES 2a and 2b) In this case, instructions to the passenger should be printed on one or both faces of the token to indicate the front and back thereof and to instruct the passenger which end to insert into the token detector chute. This token might be more suitable for the rail transit, The tokens are retained in a dispenser, indicated generally at 10, from which a token 8 is dispensed to the passenger at boarding. In the case of a bus, the token is dispensed upon boarding, and in the case of a train, the token is dispensed at or on entering the station. The dispenser 10, having a housing 11, includes a plurality of vertically disposed magazines or channels 12 adapted to accommodate a stack of tokens 13. Near the bottom or end of each magazine is mounted a partition 14 extending transversely to the magazine, and a stack of tokens 13 is supported on or against the fixed partition. Each partition is provided with an opening 15 extending along a substantial portion thereof, or where desired, the partition may be bifurcated. Each magazine 12 is provided with a horizontally disposed slot 16 in substantial alignment with the lower-most token in the stack, and substantially coincident with said slot 16 is an opening 17 in housing 11. Adjustable plate member 18, having set screws 19, is adjusted so that the slot 16 accommodates no more than one token, thereby assuring the ejection of only one token at a time from the magazine. In addition, each magazine is provided with a longitudinally disposed slot 20 with respect to the magazine, and a microswitch 21 is adjustably mounted on the back of said magazine near the lower end of said slot.

Disposed beneath each fixed partition 14 is an actuating solenoid 22 provided with an armature 24 pivotally connected at its outer end by means of a pin 26 to a reciprocating bar or pusher 28 which is substantially parallel with the fixed partition 14 and mounted beneath the fixed partition. Bar 28 is provided with an upwardly extending friction member 30, such as a rubber tip or other suitable member, which protrudes through opening 15 provided in fixed partition 14 and contacts the underside of the lowermost token in the stack 13. Spring 32 urges the bar 28 outwardly against the action of the solenoid, and spring 34 maintains the pressure on the friction member 30 against the underside of the token.

The tokens are relatively light, and in order to keep the stack pressed down to facilitate ejection of the token from the bottom of the stack, a weight 36, having an integrally formed arm 38 extending laterally therefrom, rests on top of each stack and travels downwardly as the tokens are removed. The arm extends into the longitudinally disposed slot 20 in the magazine for slideable engagement therein. In the downward travel of the weight, the integral arm 38 contacts the normally open microswitch 21 thereby closing the circuit to an appropriate signal, such as a light, buzzer or the like (not shown), indicating that the magazine is nearly completely empty of tokens and that additional tokens should be added to the magazine.

The token dispenser 10, as illustrated, is provided with five identical magazines for retaining the tokens in stack form whereby the lower-most token is removed successively from the appropriate stack. The tokens are provided with a predetermined code as explained above. The tokens in each stack bear an identical code, but differ from those in the other stacks. In this manner, a different token is provided for each zone of the bus route.

The actual token being dispensed at any moment is controlled by both a trip code selector switch means, indicated diagrammatically by numeral 39 in FIGURES 8 and 9, and the zone selector switch means, indicated diagrammatically by the numeral 40 in FIGURE 9. This operation might be readily illustrated with respect to a bus transit and with particular reference to FIGURES 8–12. The trip code selector switch is changed periodically by the driver, such as at the end of a terminal-to-terminal run made over a bus route. It is immaterial at what switch position the driver starts, and he merely progresses from a position of the switch, up through the highest number, back down again, and then repeats the procedure. In the example illustrated in the drawings, there are five positions to this switch such that the same code selection will come up again on the sixth trip.

The function of the trip code selector switch is to select which token will represent which zone. As explained above, the illustration employs four zones and five codes. In the second switch position $b''$ and $b'$, for instance, at which the switch is shown in FIGURES 8 and 9, the following is set:

Zone 1 is represented by token code 5.
Zone 2 is represented by token code 1.
Zone 3 is represented by token code 2.
Zone 4 is represented by token code 3.
Dummy, no zone, by token code 4.

As the bus moves along the route, the driver operates the zone selector switch so that its setting corresponds to the number of the zone the vehicle is actually in. The transit company can mount boards at appropriate stops where zones end, stating "Change Zone Selector on Leaving This Stop," or this may be done by automatic electrical or mechanical means which form no part of this invention. The zone selector switch directs the power supply to one of a number of lines, with each line having an electrically operated relay and associated contacts for operating only that token dispenser which carries a token representing the zone in which the vehicle is now travelling, as explained in greater detail here below.

A suitable electrical circuit arrangement for controlling the operation of the token dispenser is shown in FIGURE 9, but other suitable designs may be employed. Electrical power is provided from a suitable source, such as a 12 volt battery, as indicated generally at 42. The circuit employs a zone selector switch 40, which may be a conventional multiple position switch including rotor poles 43, 44, 45, 46, 47, 48 and 49, and is set by the driver to correspond to the zone number in which the vehicle is located. For each zone there is a corresponding contact position for the zone selector switch, and these contacts are indicated by the letters $a$, $b$, $c$ and $d$ corresponding to their zones 1, 2, 3 and 4, respectively. Lines 50 extend from each contact associated with rotor pole 47 to the trip code selector switch 39, connecting to poles 51, 52, 53 and 54 having contacts $a'$, $b'$, $c'$, $d'$ and $e'$ corresponding to their codes 1, 2, 3, 4 and 5, respectively. The circuit is then completed to one of the token code lines 56 which is selected upon positioning of the switch of said code selector, and in the embodiment illustrated there are five codes and therefore five token code lines. Token code lines are provided with relay coils $58a$, $58b$, $58c$, $58d$ and $58e$, and the lines then return to the power supply.

Branched lines 60 extending from a power source, such as a 12 volt battery, having contact or switch 61 operated by the passenger upon pressing the push-plate 62 associated with the dispenser 10, extends to the solenoids 22 in the token dispenser. Branched lines 64 connected to the power source extend to the marker lights 66 on the exterior of the dispenser, and then return to the power supply via bus bar 68. The branched lines 60 and 64 are provided with contacts 69 and 70, respectively, actuated by relay coils $58a$, $58b$, $58c$, $58d$ and $58e$ in the token code lines 56.

When the zone selector switch 40 is set for the appropriate zone, the circuit is directed to the relay coil in the corresponding token code line as described above. When the passenger boards the bus, the push-plate 62 for the token dispenser is pushed by the passenger thereby completing the circuit to the preselected actuating solenoid 22 in the appropriate magazine which retains the tokens representing the zone in which the vehicle is travelling. Current is continuously directed to the appropriate marker light 66 to indicate to the passenger the magazine from which the token will be dispensed while the bus is in that zone, in order to assist the passenger in case another incorrect token happens to be partially ejected. In FIGURE 9, relay coil $58b$ is energized thereby closing its associated contacts, and when contact 69 is closed, the corresponding solenoid 22 in that line is energized, and it will attract its armature 24 thereby actuating bar 28. The release of the push-plate by the passenger is almost instantaneous, and bar 28 is returned to its original position by means of the return spring 32 or other suitable bias means. In this manner, the rubber tip 30, which protrudes through the opening 15 in fixed partition 14 and is in contact with the underside of the lower-most token in the stack, horizontally translates or advances the individual token from the bottom of the stack. Hence, this lower-most token is partially ejected from the magazine and protrudes through the horizontal slot in the dispenser whereby it is visible to the passenger, who then removes the token completely.

The token detector, indicated generally by the numeral 72, comprises a longitudinal chute 73 formed by a pair of spaced parallel walls 74 and 75, preferably formed of transparent plastic material, and desirably having outwardly sloping upper lips 76 which define a guideway to facilitate insertion of the token. Walls 74 and 75 of chute 73 are provided with two vertically spaced slots 77 and 78. Two spaced closure members, indicated generally by the numeral 79, comprise shelves 80 and 81 laterally disposed with respect to the chute and downwardly depending legs 82 and 83 formed integrally with the shelves. The closure members are positioned such that the shelves are in alignment with the slots 77 and 78 so that upon substantially lateral movement of the closure members, the shelves can pass through the slots thereby blocking passage in the chute. The downwardly depending legs are pivotally supported near the bottom to fixed plates 91 and 93 by pins 84 and 85, and springs 86 and 87 urge the closure members to a blocking position of the chute. Electromagnet coils 88 and 89 arranged above fixed plates 91 and 93 and opposite each iron slug 90 and 92 depending from each leg actuate the closure members against the action of the springs 86 and 87.

It will be observed that passage through chute 73 of the token detector is governed by the horizontal translation of the shelves 80 and 81 of the closure members 79. The solenoid 88 for the upper closure member 79 is normally energized to retain the upper shelf 80 in a chute opening position. Upon being de-energized, spring 86 urges the shelf to a chute blocking position, thereby preventing insertion of a second token into the chute for detection before a previous token has been passed completely through the chute. Shelf 81 of the lower closure member 79 is normally in a chute closing or blocking position to block passage of the chute thereby preventing the token from dropping through the chute before there has been ample time to detect the fare, as explained hereinbelow.

An appropriate photoelectric cell detecting means, comprising a photoelectric cell detector head 94 and an incandescent lamp 96, is arranged intermediate the spaced closure members 79 such that when the token is dropped into the chute, the leading edge of the token abuts the closed lower shelf 81, and the prepunched code of the token is aligned with the photoelectric cells. The photoelectric cell detector head desirably comprises photosensitive cells with resistance characteristics changing with the presence of light. The maximum number of holes in the token is determinative of the number of photoelectric cells, such that for each hole in the token there is a photoelectric cell. In addition there is one gating photoelectric cell which detects that the token has been inserted in the chute, and keeps the power supply off to the other photoelectric cells until the token is in its correct position for reading so as not to confuse reading the wrong series of holes.

A substantially triangularly shaped guideway 100, having side rails 102, is pivotally mounted by pin 104 at the bottom of the chute below the lower closure member 79 and is movable into the dotted line position of FIGURE 7. Leg 106 depending downwardly from the base of the guideway extends freely into the substantially U-shaped member 108 carried by the armature 110 of solenoid 112. The guideway 100 is normally urged in one position by spring bias means 114 suitably anchored at 116. When the token is accepted and the fare has been paid by the passenger, the token drops through the chute and is directed along slide 118 by means of the guideway and through opening 120 to a token receptacle (not shown). In the event there is any question concerning the token or fare, the solenoid 112 is energized thereby pivoting the guideway 100 to its other position (the dotted line position) against the action of the spring. The token drops from the chute and is directed along slide 122 by means of the guideway and through opening 124 to another token receptacle (not shown).

As explained above, the illustrated embodiment of the token employs three holes operating on a five code system employing four zones. The photoelectric cell detector head therefore has four photoelectric cells, one photoelectric cell for each hole in the token, shown diagrammatically in FIGURE 8 as 94a, 94b and 94c, and one photoelectric cell shown in FIGURE 8 as 94d for the gating relay 98. The gating relay comprises a relay coil 126, normally in an energized state, and a plurality of contacts 128, 130, 132 and 134 which provide a path for the circuit depending on the energizing or de-energizing of the relay coil. Contact 128 is open when relay 98 is de-energized, and closed when the relay is in its energized position thereby completing the circuit to energize the electromagnet coil 88 in the token detector 72 and maintain the shell 80 in a chute-opening position. At the beginning of each operation, the chute is therefore in an open position to receive a token. Contacts 130, 132 and 134 are in a normally open position. When the token is dropped into the chute, the solid part of the token interrupts the light to the gating photoelectric cell 94d, and this in turn de-energizes the relay coil 126 thereby closing contacts 130, 132 and 134 and opening contact 128.

Each photoelectric cell 94a, 94b and 94c leads to the relay tree, indicated generally by the numeral 136, via code detector relay coils 138, 140 and 142, respectively. The relay tree is a conventional circuit arrangement comprising said relay coils and associated contacts 144, 146, 148, 150, 152, 154, 156, 158, 160 and 162 to complete the required circuits, and it should be understood that the branches of the tree depend upon the code system employed. When contact 130 of the gating relay is closed, a circuit is established through the relay tree 136 depending upon the combination of relays energized which in turn will depend upon the condition of the photoelectric cell determined by light passing through the holes in the token or being blocked by the token. When a hole in the token is aligned with a photoelectric cell, light falls on the photoelectric cell, thereby reducing the resistance which in turn energizes the correponding relay coil. This then operates the appropriate contacts of the relay tree thereby establishing a path for the token circuit. When light is blocked by the solid portion of the token, the resistance of the photoelectric cell remains high, the relay coil remains in a de-energized state, and the corresponding contacts remain in their de-energized positions. The token circuit through contact 130 and the operated contacts of the relay tree 136 lead to lines 164, 166, 168, 170 and 171, and then to the contacts and poles of the trip code selector switch 39 as shown in FIGURE 8. Switch 39 includes poles 151, 153, 155, 157, 159. The circuit continues via one of the lines 173, 174, 175 and 176 (each line representative of a zone in the system) through zone selector switch poles 43, 44, 45 and 46, and even through the reduced or child's fare relay indicated generally by the numeral 172, having coil 178 and associated contacts 179, 180, 181, 182, 183, 184, 185, 186, 187, and to the price-lines 163 shown as indicating fares of 5¢, 10¢, 15¢ and 20¢.

Another circuit is taken through contact 132 of the gating relay and provides power to operate the off-zone counter (see FIGURE 9). The counter is a conventional instrument, and preferably there is provided one counter for each zone to count the number of passengers alighting within each zone. When the gating relay 98 is de-enregized, contact 132 closes and completes the circuit to pole 49 of the zone selector switch 40. The position of pole 49 determines which counter is energized. Where desired, an additional line can be taken off each contact on the output side of pole 49 and input side of poles 43, 44, 45 and 46 of the zone selector switch and connected to a socket (not shown). This socket will then receive a plug which will connect these lines into a separate portable statistical data analyzer and recorder.

The trip price stepping switch indicated generally by the reference numeral 188, comprises multiple levels 189, 190, 192, 194 and 196. The trip price stepping switch is of conventional design and structure comprising wiper arms 198, 200, 202, 204 and 206 and associated sets of contacts 208, 210, 212, 214 and 216. In order to drive the wiper arms, and to control this action, there is included step coil 218 with associated interrupter springs 219 and off-normal springs 220, usually cam-operated, to provide movements either by self-stepping or pulse-stepping. Additional control is provided by the trip price relay 223 with coil 224 and contacts 225 and 226. The wiper arms of the trip price stepping switch sweep over and make contact with a required number of contact positions. The wiper arms may be either bridging or non-bridging as required by the function. The circuit through contact 134 goes to contact 226 which is normally closed. The circuit then continues to the step coil 218 of the trip price stepping switch. For level 189, four contact positions are used to represent the various possible trip prices (fares) as required by the particular application and shown here for illustrative purposes only as 5¢ steps. The switch might be identified as the trip price stepping switch.

The eject and reset push button 236 on the driver's control console for the bus is intended for use when the driver is doubtful of the validity of a token or a passenger is disputing the fare which the token is indicating, or the driver has reason to believe that the equipment has malfunctioned. Contact 238 of the eject and reset push button applies power to coil 228 of relay 227 which operates its three contact arms thereby causing the trip price stepping switch 188 to home, because contact 234 supplies power to step coil 218. Off-normal spring 220 is closed when the trip price stepping switch is away from home. A second contact 240 on the eject and reset button 236 completes a circuit to a proprietary coin accumulator, shown generally at 244, and energizes the return money release solenoid (not shown), thereby returning any inserted money to the passenger. A third contact 242 completes a circuit to solenoid 112 to actuate guideway 100 below the token chute 73. This mechanism is normally spring held in a position to guide a token which drops through the chute into a token receptacle. When solenoid 112 is energized, however, the guide mechanism is moved to the dotted-line position and the path of the token is diverted so that it now drops into the token reject receptacle which is accessible to the passenger or driver.

In the operation of the fare collection system, there is illustrated by way of example for a bus system a passenger who has boarded in zone 2 and has taken a token bearing code 1. When alighting in zone 3, the token is dropped by the passenger into the chute 73 of detector 72 thereby de-energizing the gating relay coil 126. A circuit is taken through gate relay contact 130 to the relay tree 136, through contacts 144, 148 and 154, and via code 164 to the trip code selector switch 39 pole 153 for zone two. The circuit continues via line 174 through zone selector switch 40 and continues through pole 44 to line 161, and then enters the child's fare relay 172 at contact 182 to that price line 163 which represents a fare for two zones of travel or 10¢. The circuit then enters the trip price stepping switch 188 at the 10¢ position.

As explained above, a separate circuit through gate relay contact 134 energizes the step coil 218 of the trip price stepping switch 188 through contact 226 of relay 223. The stepping switch 188 now takes one step with the step coil being automatically de-energized and then re-energized through its interrupter springs 219. This stepping continues automatically until the wiper arm 198 of the stepping switch reaches the 10¢ position or contact.

When the wiper arm 198 reaches the 10¢ position, the circuit which passed through the code detector relays, the code selector switch 39, the zone selector switch 40 and the child's fare relay 172 is now completed to relay 223 and also through contact 230 of relay 227, which contact is normally closed. The relay 223 is now energized and opens contact 226, thereby removing power from the step relay 218 coil of trip price stepping switch 188. Contact 225 of the relay coil 223 now closes and a circuit through this contact holds the relay energized for the remainder of the cycle even after power has been removed from the 10¢ line 163.

The circuit through the gating relay 98 and normally closed contact 128 passes to electromagnet 88 for actuating shelf 80. When the gating relay is de-energized, contact 128 opens, electromagnet 88 is de-energized and shelf 80 is urged to a chute-closing position by means of the spring bias 86, thereby preventing another token from being inserted into the chute. In the event of a power failure to the fare calculator and payment machine, the electromagnet 88 will not be energized, and the shelf 80 will close off the chute as described above.

Levels 192 and 194 of trip price stepping switch 188 provide circuits to operate the fare read-out indicated diagrammatically at 246. The read-out unit is of conventional design and structure comprising conventional incandescent or electron-tube visual digit indicators (not shown). The contacts 212 on level 192 are connected to the "tens" indicator. When the trip price stepping switch 188 is at its normal home position, the wiper arm 202 of level 192 rests upon the contact which is connected to a red lamp (not shown) of the "tens" unit of the fare indicator. This will inform a passenger that he must stop and insert a token.

As the trip price stepping switch 188 is stepped around as described above, wiper arm 202 makes a sequence of contacts which reduce the digit indicated in the "tens" fare indicator. In the drawings shown, wiper arm 202 will come to rest on the contact which illuminates digit "1." There are two number 1's, but only one number 2, because the drawings illustrate a system where the fares will be either 5¢, 10¢, 15¢ or 20¢.

Wiper arm 204 of level 194 serves a similar function to that of wiper arm 202 for the unit digits of the fare read-out. The contacts 214 on level 194 are connected to only the "0" or "5" lamps of the read-out, as the illustration uses a fare system based upon nickel increments.

When both levels 192 and 194 reach the fare paid contact point, or step beyond the fare paid point, then they each illuminate a green lamp (not shown) in each fare read-out. This advises the passenger that his fare has been paid in full and he may proceed.

If the fare to be changed is to be at a child's reduced rate, then the driver will press the child's reduced fare button 252. (See FIGURE 9.) This establishes a circuit to the child's fare relay 172 which is then energized. Contact 179 closes, and until the trip price stepping switch steps beyond the fare paid point, wiper arm 200 will establish a hold circuit through contact 179 of the child's fare relay 172 and its coil 178 as shown. The hold circuit applies power to the child's fare relay from the power source through wiper arm 200 with its bridging contacts. Operation of the child's fare relay serves to reconnect in a different way price lines 161 from the zone selector switch 40 to the trip price stepping switch contacts on level 189. The trip price line for three zones, for example, is cross-connected to the price line for two zones when the child's fare relay operates. Other price lines are cross-connected as shown on the drawing. In the example shown, the fare of 10¢ would be reduced to 5¢ through contact 183 of relay 172, when the child's reduced fare button is pushed by the driver. Similarly a 15¢ trip would be reduced to 10¢. This crossover of connections is obtained by providing two contacts in parallel for each trip price line. One set of contacts 180, 182, 184, 186 are normally closed when the child's fare relay is de-energized, and this represents the normal fare. The contacts of the other set 181, 183, 185, 187 which are parallel with the first, only close when the child's fare relay is energized, when, at the same time, the first set of contacts open. The outputs from the second set of contacts are connected to any desired lower trip price line.

If the fare is being paid in cash, the passenger drops the money into a conventional coin accumulator 244. This coin accumulator may be of the type which produces one electrical pulse for each basic incremental unit of coinage used in the system. In the illustration, the accumulator will be considered as producing one pulse for every 5¢ unit inserted. The pulse output is taken to the step coil 218 of the trip price stepping switch. (See FIGURE 10). Each pulse thus steps the trip price stepping switch 188 one step. If sufficient coinage is put in the coin accumulator so that the total deposited is greater than the fare to be paid, then the levels on the trip price stepping switch 188 will step beyond the fare paid point. Level 196 of the trip price stepping switch 188 is intended to control the change making function of the equipment. As wiper arm 200 moves beyond the fare paid point, it establishes a power supply circuit to the token control relay 228, and this relay is energized. The token control relay has a slow operate and slow release movement. This delay will be in the order of 40 milliseconds, but this will depend on the particular system and can best be ascertained by experimentation. Contact 230, which is normally closed, of the token control relay opens when the relay is energized, thus releasing the trip price relay 223. The power supply circuit of the trip price relay is thus broken. The trip price relay is now ready for the next cycle of operation when the next passenger inserts a token.

Contact 232 of the token control relay 228 is normally open, but when the relay is energized, it closes the supply power to the electromagnet 89 in detector 72. When the electromagnet is energized, the bottom shelf 81 is pulled out of the chute to a chute opening position, and the token drops down along guideway 100 and slide 118 and is directed into a token receptacle which can be removed periodically for the emptying out of tokens.

Contact 234 of the token control relay 227 is normally open when the relay is de-energized and closes when the relay is energized. On closing, it applies a power circuit to the step coil 218 of the trip price stepping switch 188 through the off-normal springs 220 of this switch. This circuit thus causes the trip price stepping switch 188 to step to its home position, as the cam-controlled off-normal springs 220 are closed when the trip price stepping switch is away from its home position. The interrupter springs 219 break this circuit each time the step coil 218 attracts the driving armature and thus causes the step coil to be de-energized and the switch assembly to move one step. On this movement, the interrupter springs 219 reclose and re-energize the step coil. When the switch reaches the home position, which is illustrated in the drawings, then the cam controlled off-normal springs 220 open and the step coil remains de-energized.

When wiper arm 200 passes beyond the fare paid point, it also energizes the change making control relay 250. Contact 254 of this relay is normally open when the relay is de-energized and closes when the relay is energized. The change making control relay 250 is slow operating at about 200 milliseconds, so that it is slightly faster than the token control relay 227. As trip price stepping switch 188 steps around beyond the fare paid point, wiper arm 206 makes contact with the change making lines 258. In order that the change making relays are not energized as wiper arm 206 sweeps around, change making control relay 250 is given the time delay previously mentioned. After excess fare coinage has been inserted, trip price stepping switch will come to rest with wiper arm 206 making contact with one of the change making lines 258. After 20 milliseconds, approximately, the change making control relay 250 closes contact 254 and a circuit will be completed to one of the change making relays 260w, 260x, 260y and 260z. Each change making relay 260 has sufficient contacts 262 to control the energization of the required number of coin dispensers necessary to make the correct change. The contacts of the change making relays are normally open when the relay is de-energized. There is one contact 262 for each coin dispenser (not shown), which upon closing energizes a conventional solenoid unit for dispensing change. In the embodiment shown in the drawings for instance. The insertion of a 25¢ coin to pay a 15¢ fare would cause wiper arm 206 to energize change making relay 260x. This will in turn energize the solenoid on a 10¢ dispenser.

Approximately 40 milliseconds after the trip price stepping switch has come to rest, the token control relay 227 will be energized and trip price stepping switch 188 will cycle to the home position and be ready for the next passenger as previously described. As trip price stepping switch cycles to the home position, the change making relays 260 are de-energized, and thus also the solenoid on the coin dispenser.

Where desired, the transit system may employ a prepaid ticket for collecting the fare. The ticket 263 represents a stored value type of ticket comprising multiples of some particular value. The ticket is relatively thin to facilitate cutting upon insertion by the passenger into the ticket insert. The ticket may be approximately ten thousandths of an inch thick and 1¼ inches wide. It has vertical value coding bars 264 approximately ¼ inch wide so that five bars can be accommodated giving a useful range of thirty different fare values. It has horizontal value strips 266 with each being approximately ⅜ inch high so that the length of the ticket will depend upon the number of strips embodied plus the portion for the passenger to hold the ticket which might carry company insignia and instructions on use. It should be understood, however, that a ticket of different designations embodying different combinations of trip value and code bars may be used, depending upon the needs of the system. According to the embodiment shown in FIGURE 13a, there is shown twelve horizontal value strips. The value of each strip is represented by vertical coding bars 264 which are carried over the length of the value area of the ticket. Each horizontal value strip 266 thus carries the same code. Each value strip will be accepted by the payment machine as a cash equivalent, as described more fully hereinbelow. For example, if a 25¢ fare is determined and a ticket with 25¢ value strips is inserted into the machine, one strip will be cut off by the machine and 25¢ credited to the fare determined, thus cancelling the charge. If a 55¢ fare is determined, the ticket can be inserted twice to accumulate 50¢ of credit and two strips will be cut off consecutively. The remaining 5¢ could be paid either by a 5¢ value ticket, by cash or even by the 25¢ value ticket. The circuitry can be arranged so that if an excess amount is paid by a ticket, then the excess will be returned to the passenger in coins.

The ticket may be made of a clear plastic upon which has been heavily imprinted or laminated the black vertical code lines. When the ticket is aligned in front of the photocells, the arrangement of clear sections of the ticket and blacked-out sections will cause various combinations of cells to be either energized or de-energized. These cells then operate relays in a relay tree so that one single ticket value output line is energized to represent the value embodied in the ticket. In addition, the ticket basically may be of a translucent color plastic with the color being photoelectrically detected for the purpose of making fraud more difficult.

As an alternative embodiment, the vertical code bars may be of electrically conductive ink printed on either thin paper cards or plastic. In this case, the photocells in the detection example would be replaced by spring wiper contact arms. These contact arms would directly control the relays in the relay tree in substantially the same manner as a ticket requiring the photocell detector system.

If the transit company so desired, the ticket may carry on its upper portion black spaces for insertion of origin and destination validity and also date. As a further refinement, the color of the ticket may be changed according to prearranged time periods, in which case a removable photocell may be provided so that as the color validity is changed, another cell can be inserted which is sensitive to the valid color only.

Figure 14:
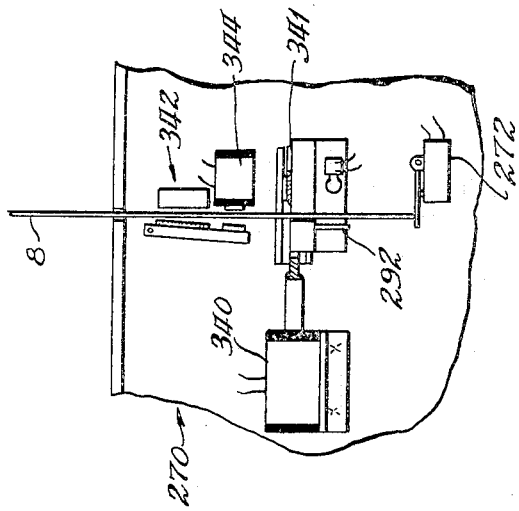
FIGURE 14 is a diagrammatic view illustrating the ticket detector and cutting mechanism.
Figure 16:
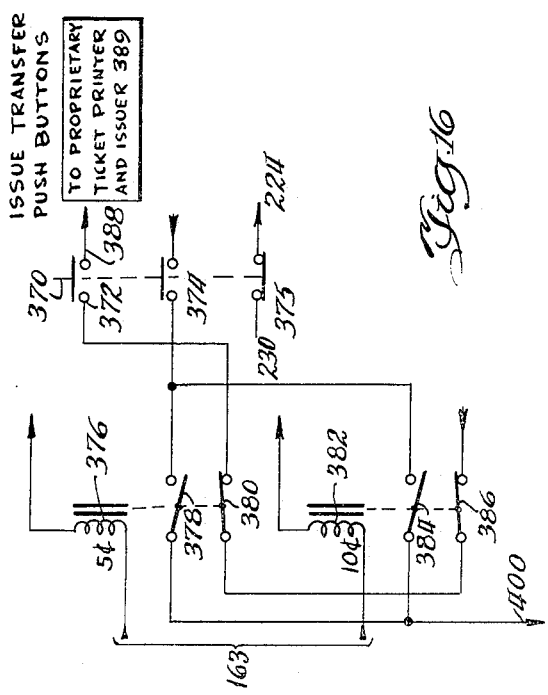
FIGURE 16 is a wiring diagram for the transfer circuit of the system of the invention.

When a passenger inserts a stored-value ticket into the ticket cutter and detector assembly, indicated generally at 270 in FIGURE 14, the lower edge of the ticket presses down onto a microswitch 272. (See FIGURES 10 and 14.) The microswitch has a normally open contact 274 (see FIGURE 10), and when the arm of the microswitch is pressed downwards by the ticket, the contact closes. Closing of the microswitch, energizes the normally de-energized microswitch relay 276. Contact 286 of the microswitch relay is normally open and closes when the relay is energized. This contact establishes a value-line circuit via line 288 to the ticket-value relay tree 290 associated with the ticket value detector photoelectric cells 292. These photoelectric cells and relays of the relay tree translate and transmit the value of the ticket in a manner similar to the relay means employed on detecting the price represented by a token. In the case of the detection of the code on the ticket, the outputs from the relay tree are in effect value lines which represent the value of the ticket being detected. These value lines 300 are connected to contacts on level 304 of the ticket value stepping switch 302 as shown. As, for example, a ticket of the value of 10¢ is inserted, then power is applied to the 10¢ contact of lever 304 of ticket value stepping switch.

Contacts 278, 280, 282 and 284 of the microswitch relay are normally open and close when the relay is energized. When contact 280 closes, power is applied to the coil 314 of the step relay 312 through contact 328 of the ticket fare relay 322. Contact 328 of the ticket fare relay 322 is normally closed when that relay is de-energized. The step relay 312 is now energized, and its contact 316 now closes and applies power to the step coil 332 of ticket value stepping switch 302 which now attracts its armature. At the same time as the armature is attracted, the interrupter spring 334 opens and the step relay 312 is released removing power from the step coil 332. The ticket value stepping switch 302 now steps one position. As the step coil 332 is de-energized, the interrupter spring 334 recloses and the step relay 312 is re-energized, and thus a second step is initiated. The ticket value stepping switch 302 now continues to step in this manner. When wiper arm 308 reaches the contact which is energized from the ticket detector relay tree, the ticket fare relay 322 is energized. The ticket fare relay 322 is now held energized by a hold circuit which draws its power from two parallel circuits. One of these is through the cam-controlled off-normal spring 320 of ticket value stepping switch 302, and contact 326 of the ticket fare relay 322. The off-normal spring 320 is closed whenever the ticket value stepping switch is away from its home position and contact 326 is closed when the ticket fare relay is energized. The second source of power for holding the ticket fare relay energized is through contact 278 of the microswitch relay and contact 326 at the relay 322. The circuit through contact 278 of the microswitch relay is to insure that the cut-off portion of the ticket is released into the magazine before the ticket fare relay is de-energized, to prevent the possibility of obtaining an excess value reading from a ticket.

As the ticket value stepping switch steps around, an interrupter spring 336 on it opens and closes for each step. This establishes a pulse output circuit 337. This circuit is completed through normally closed contact 330 of the ticket fare relay, the interrupter spring 336, a cam-operated off-normal spring 338 on the trip price stepping switch 188 to the step coil 218 of trip price stepping switch 188. Each step of ticket value stepping switch thus transmits one pulse to the step coil of trip price stepping switch, thus stepping the trip price stepping switch down so as to reduce the fare to be paid. When contact 330 of the ticket fare relay opens because the ticket fare relay 322 has become energized, then power is no longer applied to the pulse output line 337 of the ticket value stepping switch 302, and the stepping of trip price stepping switch 188 from this source is terminated.

Contact 282 of the microswitch relay energizes the ticket cutter solenoid 340 which actuates the ticket cutter blade 341 to cut the ticket. As a value strip 266 is sliced off the ticket by the blade 341, equivalent to one trip of the value of the ticket, then this strip will fall away from the microswitch 272 and release this switch. After the microswitch is released, contact 282 on the microswitch relay 272 opens and the cutter solenoid 340 is de-energized.

The ticket gripper 342 is actuated by a circuit taken through bridging level 306 of ticket value stepping switch 302. A parallel circuit supplying power to the ticket gripper is taken through contact 284 of the microswitch relay 272. These two circuits insure that the ticket gripper electromagnet 344 is energized and the ticket firmly held in place while the ticket value stepping switch 302 is sweeping or the microswitch 272 is depressed. This prevents removal of the ticket before it has been cut and also insures that the passenger does not lose the value of one strip by reinserting it into the assembly too quickly before the ticket value stepping switch 302 has homed.

The following system is provided for those companies which issue season or time period, bus only or combination bus and rail, or rail only, passes which permit the holder unlimited travel between specified points and within specified time period limits. A pass desired for this system is illustrated in FIGURE 15 and comprises the company insignia, blank spaces for date validity, for rail station validity, and blank squares for bus route and zone validity. The lines and squares are completed by the company's agent at time of purchase of the pass. The route and zone validity for a particular bus route are entered in a vertical column and might be 1 and 3 as illustrated in FIGURE 15, and any unused columns are cancelled by a cross also as illustrated. The route number entered corresponds to the particular bus route and the on and off zones which designate the range of the validity are entered. The card may also carry magnetically or mechanically coded validity data, or the card may carry only magnetically or mechanically coded validity data as described hereafter in greater detail.

On the driver's control console, there is a receptacle for the bus route card. This card carries the number of the route on which the bus is operating and is inserted either by the driver or other staff at the commencement of the route operation. There may be provided on a driver's control panel two incandescent read-outs (not shown). One read-out is controlled from the zone lines 173, 174, 175, 176 between the trip code selector switch 39 and the zone selector switch 40. The token which the passenger drops into the token detector 72 determines which zone line is energized as previously described and also determines which digit is illuminated in one of the read-out indicators. This digit thus represents the number of the zone at which the passenger boarded the bus. The second read-out indicator is controlled from pole 48 of the zone selector switch 40 and shows the zone number in which the bus at that moment is travelling. This represents the off-zone for the passenger. In order to check the validity of the ride being completed by the passenger, the driver visually compares the route and on and off zones printed on the passenger's pass, and the route and on and off zones indicated and illuminated on his console. If the range of zones on the pass is equal to or less than the range of zones on the console, then the journey is valid. For example, if the pass is valid for Route 134 between zones 1–3, and the passenger is on bus Route 134, and the on and off read-out indicators on the driver's console show zones 1 and 2, then the journey undertaken is within the range of the pass validity. If, however, the zone range on the driver's console is in excess of zone range on the passenger's pass, then an excess fare will be charged by the driver. If, for example, in the case indicated above, the driver's read-out indicator showed zones 1 and 4, then the passenger has travelled one excess zone, i.e. he is alighting at zone 4 when the pass is valid only up to zone 3. In order to charge the passenger for the excess fare, the driver presses the appropriate pass excess fare push button 350 corresponding to the number of excess zones (see FIGURE 12). In this case it would be number 352. Operation of, for example, push button 352 completes a circuit to electromagnet 89 through contact 358 and the token is released. A second circuit is completed through contact 360, through contact 226 of the token price relay 223 and starts the trip price stepping switch 188 stepping. A third circuit is completed through contact 362 of the push button 352 to the trip price line 163, which corresponds to the price of a fare for the excess zones travelled. Pushbutton 354 with contacts 355, and pushbutton 356 with contacts 357, work substantially the same as pushbutton 352 described above.

If the pass is completely valid for both route and zone range travelled, then the driver presses the clear button 364. This completes a circuit through its contact 366 to the coil 228 of the token control relay 227. This operates contacts 230, 232, 234 on the relay, which perform functions as previously described. This causes electromagnet 89 to be energized, the token to fall through and the trip price stepping switch 188 to home ready for the next passenger. When the fare read-out indicator has turned red, the driver knows that the payment machine has been reset. A second contact 368 on the clear button 364, which is normally closed, is connected in the circuit to eletromagnet 88, which also passes through contact 128 of the token gate relay. This insures that while the driver has the clear button depressed, then the top shelf electromagnet 88 is de-energized allowing the shelf to close off the chute and stop insertion of another token.

If the transit company wishes to install the fare system of my invention, while at the same time retaining a flat fare system on other routes and buses with free transfer facilities, then the transfer can be incorporated into the zone fare system as follows. The fare at which a free transfer will be issued will be determined by the company. For example, if the flat fare in that portion of the transit system not operating on a zone-fare system is 15¢, it may be determined that a free transfer would always be obtainable upon payment of a zoned-fare which is equal to or greater than 15¢. A further refinement may be when a sur-charge is included to increase the value above the flat fare ride. The driver's control console (not shown) may be equipped with an issue transfer pushbutton 370, which controls a proprietary roll ticket printing and issuing machine 389. Also, in these controlling circuits are issue transfer relays, of which there will be one for each fare denomination below that at which a transfer is issued free. If, for example, in the case illustrated, a fare at 15¢ is taken as the transfer requirement, then there will be a 5¢ and a 10¢ relay, 376 and 382. These relays are energized from the appropriate price line 163. If, for example, a fare at 10¢ is being read from a token, then relay 382 would be energized. With either relay energized, the control circuit 388 to the ticket machine is broken at either contact 380 or 386, so that operating pushbutton 370 will not energize the ticket machine even though contact 372 closes.

When either relay is energized and contact 374 at the pushbutton is closed, power will be applied to line 400, which is connected to the price line selected for transfer issue, e.g. 15¢. This is due to contacts 378, 384 being connected in parallel.

Contact 375 on pushbutton 370 opens when the button is operated. This contact is in the circuit of the token price relay 223 between coil 224 and contact 230. When pushbutton contact 375 opens, relay 223 is de-energized, contact 226 closes, and the trip price stepping relay 188 steps by virtue of power being applied to step coil 218.

The issue transfer relays will have a time delay release at ½ second approximately, to insure that the trip price stepping switch has stepped around to its new position before power is removed from the price line selected for transfer issue. After the energized issue transfer relay releases, the ticket issuing machine is energized.

For the acceptance of token into payment of the differential fare, the transit company must allocate a cash equivalent value to a transfer. Thus, when a passenger presents a transfer, the driver will press an accepted transfer pushbutton which will reduce the value of the fare indicated by the cash equivalent amount allocated to a transfer. This is accomplished by completing a circuit through the accepted transfer pushbutton contact, which is normally open, to the appropriate ticket value line.

The detection of the insertion of a fraudulent code on a token is carried out through pole 159 of the trip code selector switch 39. In the example illustrated, only four codes are used out of a possible five at any one time, and the fifth dummy code is directed to the output at pole 159, which is connected to a buzzer 402. The code thus directed will change as the setting of the trip code selector switch is changed.

In the rail system, it is likely that there will be so many stations which are equivalent to zones on the bus system that it is not convenient to detect the boarding zone or station represented by the token through a conventional relay tree such as illustrated in the bus system. In this case, it will be more convenient to break the hole codes on the token down into groups and apply the output to a solid state decoding matrix. If, for example, an eight hole code is being used, then it could be broken down into two groups of four holes. Each group of eight holes could have a conventional relay tree providing thirty-two outputs. These two sets of thirty-two outputs would then be applied to the X axis of abscissus and Y axis of ordinate of a matrix. Such a matrix would have thirty-two lines on the X axis and thirty-two lines on the Y axis, giving two hundred and fifty-six crosspoints. Such a matrix would be of conventional solid state type and might employ diodes at the crosspoints to give an output line at each crosspoint. Each crosspoint would thus represent one station. As the payment machine is fixed in its location at a particular station, the fares from each other station to the station of location is known. On the output side of the matrix those output lines which represent stations having the same fare to the station of location would be connected together. The final output will thus be a series of price lines, thus effectively translating the token code into a price line. If, for example, there are sixty different fares in a rail system having two hundred and fifty-six stations, then the two hundred and fifty-six crosspoint outputs would combine in appropriate arrangement to produce sixty output price lines. These price lines are the exact equivalent of the price lines in the bus system.

In order to provide for changing the code which represents each station, as is done on the trip code selector switch on the bus system, the code lines could pass through a plug-and-socket assembly before being grouped into price lines. Any other conventional method of changing the connections at circuits could be used. This assembly could have a number of alternative sockets to receive the plug equal to the number of coded scramblings which is desired. If, for example, five different rearrangements of codes are desired, then there would be five different socket connections. This assembly performs the same function as, and takes the place of, the trip code selector switch in the bus system. The arrangement of the code scramblings would be changed periodically as is felt necessary by the operator as a deterrent to fraud.

In the rail system, each payment machine does not require the zone selector switch, which is part of the bus system, as the payment machine is permanently wired for establishing fares to the station of permanent location. Similarly, the off-zone counter of the bus system does not need to pass through a multiple position switch, but is connected directly to the gating relay merely receiving one pulse each time a token is dropped in. The reduced fare relay and its operation may be either included or omitted from the rail system.

The token dispenser for the rail system is similar to the unit for the bus system except that its size will be suitable for the size of the token dispensed. The selection of the token to be dispensed will be made with a multiple position switch housed in the section of the dispenser which carries the passenger pushplate. This switch will be set either manually or by remote control by the company staff as determined by operating policy to reduce fraud.

The pass excess fare pushbuttons, which form part of the driver's console of the bus system, are not required in the rail system as excess fares on a pass, are computed and demanded from the passenger automatically. The rail system desirably would follow the general arrangements shown in the block diagram FIGURE 17. The token acceptor chute 404 is substantially the same as for the bus system. The token detector 406 and its relay tree circuits may be different from the bus system as described above. After the price lines have been obtained from the solid state decoding matrix 408 as previously described, it may be desirable to convert the fare price represented into binary coded decimal. This could be done using conventional solid-state single line to binary coded decimal converters 410. The fare in binary coded decimal would now be introduced as an addition to a bidirectional binary coded decimal counter 412. The state of the binary coded decimal bidirectional counter would be indicated by an electronic tube type digit read-out indicator 414, with one indicator being provided for each unit 10, per 100th, etc. of the basic fare increment. For example, three units will be required to indicate fares up to $9.99.

The proprietary coin accumulator 416 would have the pulse output from its associated pulse generator 418 directed by a pulse director 420 to either a unit to convert the pulse in converter 422 into binary coded decimal suitable for the operation of solid state devices, or directed to a conventional electromechanical stepping switch 424. The sequence of direction will depend upon whether or not the fare paid point has been reached. Before the fare paid point has been reached, the pulse output from the coin accumulator will be fed into the bidirectional counter 412 as a subtract. After the fare paid point has been reached, the pulse will be directed to the stepping switch 424, which will control the changemaking relays and coin dispensers 426 in a similar manner as for the bus system with the difference that stepping switch only starts operating after the fare paid point.

The translation of a ticket value code into a form acceptable to a solid state bidirectional counter requires a relay tree code detector 428 as described for the bus system plus unit 430 to convert to binary coded decimal or pulse output. The stored-value ticket for the rail system, as illustrated in FIGURE 13(b), employs coding similar to the bus stored value ticket of FIGURE 13(a), except that additional vertical coding 264 is added to establish a time period validity. Where desired, these coding bars may be magnetically embodied in a coated backing to the ticket which is suitable for storing magnetization.

It should be understood that in the case of the token detector 406, coin accumulator 416, and the detector 428, the outputs of all these units may be introduced to the bidirectional counter 412 in pulse form rather than final binary-coded decimal form.

In this case, pulse generators will be required for both token price and ticket value lines. Conversion from pulse to binary coded decimal would then take place in the bidirectional counter 412.

The ticket cutter for cutting-off from the ticket a value strip would be energized by operation of the ticket microswitch in a manner similar to that used on the bus system. The operation of the pulse director 420 in the output from the coin accumulator 416, the interlocks 434 on the barrier gates 436 and the operation of the upper blockout shelf 80 in the token chute 73 will be controlled by a unit 438. This unit will continuously compare the total in the bidirectional counter 412 with zero. When the bidirectional counter 412 reads zero at the fare paid point, the pulse director 420 will be instructed to feed coin pulses to the stepping switch 424, the barrier interlocks 434 will be released and electromagnet coil 88 will be operated so that the top shelf 80 will open when the passenger starts to pass through the first barrier gate 436.

If a system as described previously employing solid-state units operating with binary coded decimal, is not required, then a system with intermediate operating speed can be provided by substituting a shift register arrangement of flip-flops for the trip price stepping switch 188 of the bus system. This operation is understood by those familiar with the art of computing machines.

As an alternative arrangement to visually checking the pass, appropriate circuits may be employed to check validity of the pass and to cancel the whole or part of a fare demanded. The pass as illustrated in FIGURE 15 carries coded information, either magnetically or mechanically, identifying the valid points of origin and destination and time period validity.

Referring now to FIGURE 18, upon insertion of the coded pass into a suitable acceptor (represented diagrammatically by the numeral 500) for the payment machine, the time period validity on the pass is checked by applying the code to either a relay tree or a solid state equivalent 502. If the correct time period circuit path is established, the circuit will be completed via line 503 to permit the machine to read the station validity data at decoding matrices 504. The codes representing the two stations between which the passholder is entitled to travel is decoded at 504 in a manner similar to the method used for reading a token code except that the output from the matrix will not be converted into price lines. There is a decoding tree or matrix for each station embodied in the pass. In addition, on those systems where a specific multiple route must be followed by the passholder, the valid interchange points are also coded onto the pass. Similar decoding matrices 504 are provided for the maximum number of interchange points required. From the decoding matrices 504 run pass code lines 506 to the pass check circuits 508. From each decoding matrice 504, there is a line for each possible station.

For each single payment machine or group of payment machines there is provided an electrical representation, in pass check circuits 508, of the route or routes for which a pass may be valid. As described with reference to FIGURE 17, insertion of a token into the token acceptor 404 of a payment machine will cause the point at which the journey originated to be identified by detector 406 and matrix 408. Token code lines 510 pass from matrix 408 to the pass check circuits 508. Insertion of the pass into the pass acceptor 500 of a payment machine establishes within the pass check circuits the two points between which travel is valid and also the route which must be followed. The point or rail station at which the payment machine is located at the time of insertion of the token and pass is also identified within the pass check circuits. The pass check circuits compare the journey actually made by the passenger, by virtue of the token which he inserts, and the journey which he is entitled to make on the pass, by virtue of the data coded onto the pass. The pass check circuits then determine that portion of the journey which the passholder is entitled to make. The pass check circuits then derive the value of the fare of this overlapping portion, and as shown in FIGURE 18, the output is fed via the pass value lines 512 to the subtract section of the bidirectional binary decimal counter 412.

Reference is now made to FIGURE 19 showing the circuit arrangement of the pass check circuits 508. For illustrative purposes only, reference is made to a rail system having individual stations. It should be understood however that the circuits are equally applicable to any system with points of origin and destination. There is shown four stations, A, B, C and D. (With respect to FIGURE 19, although the same reference numeral indicates the same element throughout, a letter suffix is used where required for purposes of clarity to indicate the element in association with one of the four stations.)

For each station representation, there are normally two relays 516 and 518 which are controlled by the token inserted into the token acceptor 404 by the passenger, except that the representation of the outer terminal station uses relay 518 only. The relays employed in the pass check circuit are conventional relay coils and associated contacts. Relays 516 and 518 are normally in a de-energized condition. The individual token code lines 510 taken from matrix conversion 408 (FIGURES 17 and 18) are taken to the appropriate token identification relays 518. Each token code line represents one station and therefore goes to one 518 relay which represents that station in the electrical representation.

For each station, except the outer terminal station, there are three pass identification relays 520, 522 and 524. The outer terminal station has only relay 522. For each station there is one fare determination relay 526. Within the pass check circuits, the station at which the passenger has alighted is represented by a relay 526. Relay 520 is normally energized and relays 522, 524 and 526 are normally de-energized. The pass code lines 506 for each station derived from the decoding matrices 504 are connected to relay 522 and relay 524 as shown in FIGURE 19. Each pass code line is identified with a particular station, and controls the relays 522 and 524 of that station, although the circuits are taken through contacts of relay 522 of the station beyond that station being controlled. The pass code lines are normally de-energized, but become energized when a code occurring on the pass corresponds to that particular code line. It should be understood that the switching arrangement of these circuits could be carried out using solid state devices.

The journey actually taken by the passenger and the journey to which the passenger is entitled by the pass may or may not coincide. That is, the pass may cover all or part of the journey in various arrangements. A number of these possible overlapping arrangements are illustrated schematically in FIGURES 20(a), 20(b), 20(c), 20(d), 20(e), 20(f), 20(g), 20(h) and 20(i). For example, in FIGURE 20(a), the route and zone validity data for the pass coincide with the route travelled by the passenger. On the other hand, in FIGURE 20(b), the passenger boarded within the limits permitted by the pass; whereas, in FIGURE 20(c), the passenger boarded at a station beyond the limits permitted by the pass, and in FIGURE 20(d), the passenger deboarded at a station beyond that permitted by the pass. According to the diagram of FIGURE 20(e), the passenger boarded and deboarded at stations beyond the limits of the pass. FIGURE 20(f) illustrates where the passenger boarded within the route and zone validity permitted by the pass, but deboarded at a station beyond that permitted by the pass. In FIGURE 20(g), the off-station is within the route and limits validity permitted by the pass, and in FIGURE 20(h), both the on and off stations are within the validity data of the pass.

FIGURE 20(i) illustrates a passenger boarding at a station beyond that permitted by the pass and deboarding at a station within the route and limits validity of the pass.

In order to illustrate the method and operation of the pass check circuits, the operation of arrangement 20(e) will be described. Assume in FIGURE 19 that a token is inserted in a payment machine representing a journey originating at station D, and that a pass is inserted which is valid for travel between stations B and C. Energization of token code line 510 at station D causes its relay 518D to close, thereby closing contacts 528 and 530. The closing of contact 528 will energize relay 516C of station C thereby closing contacts 532 and 534 and opening contact 536. The closing of contact 534 will energize relay 516B of station B thereby closing contact 538 and opening contact 540.

As token code lines 510C and 510B are not energized, relays 518C and 518B remain de-energized, and consequently contacts 550 and 580 remain closed and 551, 552 and 581 remain open. Similarly, in the de-energized state, relay 520B has its contacts 610 and 612 open, and its contacts 606, 608 and 614 closed; relay 520C has its contact 562 open and its contacts 556, 558, 560 and 564 closed; relay 522B has its contacts 594, 596 and 598 open and contacts 595 and 597 closed; relay 522C has its contacts 544, 546 and 548 open and its contacts 545, 547 and 549 closed; and relay 522 has its contacts 531 and 533 open and contacts 529 and 542 closed. Also, relays 524B and 524C, in the de-energized state, have their contacts 525 and 527, respectively, closed. Still further, relay 526B, being in the normally de-energized state, has its relays 566 and 568 open, as does relay 526C have its contacts 572, 574, 575, 576 and 577 open, as does relay 526D have its contacts 616, 618 and 620 open.

When pass code line 506 at station C is energized, a circuit will be completed through contact 542 of relay 522D of station D to energize relay 522C of station C, thereby opening its contacts 543, 545, 547 and 549 and closing its contacts 544, 546 and 548. When pass code line 506 at station B is energized, a circuit will be completed through contact 548 and relay 524B at station B will be energized.

The valid amount of fare which can be subtracted from the fare to be paid, by virtue of the pass validity is obtained in the following manner. A circuit is completed through contact 550 of relay 518C of station C and contact 532 of relay 516C at station C, contact 562 of relay 520C at station C [relay 520C is normally energized], contact 546 of relay 522C of station C to the coil of relay 526C at station C. A similar circuit is established through relays 518B, 520B and 522B of station B through contacts 580, 538, 614 and 597, and relay 526 of station B is energized. Relays 520B and 522B have contacts as shown corresponding to that of contacts for relays 520C and 522C. A circuit is thus completed through contact 568 of relay 526B at station B and contact 576 of relay 526C at station C, thus establishing a valid pass value line, which represents the value of the fare between stations B and C. This is then fed via line 575 as a subtract to 412 of FIGURE 17 through ticket value converter 430.

In this particular case, the amount of the subtract is less than the actual fare demanded by the payment machine and the difference will remain indicated on the payment machine, and the passenger may pay this by cash or by a stored value ticket as described above. A difference will remain indicated in the payment machine on all those cases where the travel validity of the pass is less than the journey actually taken. In those cases where the journey made is less than the travel validity of the pass, then the amount of the travel subtracted from the fare demanded will be equal to or more than the fare demanded.

These various possible fare substractions are obtained by the interconnections between contacts and relay coils as shown in FIGURE 19. In each case, the circuitry is such that only the pass value line representing the fare between stations covered by both the token and the pass validity is energized.

What is claimed is:

1. In an automatic fare collection system based on a post-checking of fare payment for a transit route having multiple-zone fares, whereby a plurality of code-bearing tokens of differing codes representative of the boarding zone in which said token is selectively dispensed to a passenger at boarding and a fare is collected at passenger deboarding based upon a reading of the coded token, the improvement comprising: selector means having multiple positions for identifying respective code-bearing tokens with particular zones and including means for changing said identities; and zone selector means having multiple electrical circuits correlated to the number of zones in the transit route and set successively for a zone in the transit route thereby selecting an appropriate coded token to the zone for dispensing to a passenger at boarding.

References Cited

UNITED STATES PATENTS 2,783,865  3/1957  Cleave.
3,026,029  3/1962  Daniels _____ 235—61.12

DARYL W. COOK, Primary Examiner